United States Patent [19]

Gruber et al.

[11] Patent Number: 4,783,608
[45] Date of Patent: Nov. 8, 1988

[54] ELECTRIC MOTOR WITH AN IMPROVED BEARING

[75] Inventors: Francois Gruber, Monroe, N.C.; André Renaud, Fontenay-Le-Fleury, France

[73] Assignee: Etudes Techniques Et Representations Industrielles E.T.R.I., Neuilly sur Seine, France

[21] Appl. No.: 67,630

[22] Filed: Jun. 25, 1987

[30] Foreign Application Priority Data

Jun. 27, 1986 [FR] France ............... 86 09360

[51] Int. Cl.$^4$ ............................................. H02K 5/16
[52] U.S. Cl. ................................. 310/90; 310/51; 310/43; 310/45; 310/67 R; 384/215; 384/296
[58] Field of Search ............. 310/67 R, 90, 62, 63, 310/51, 43, 45, 254, 261; 384/215, 220, 296

[56] References Cited

U.S. PATENT DOCUMENTS

| 2,427,947 | 9/1947 | Koch | 310/67 R |
| 4,117,359 | 9/1978 | Wehde | 310/90 |
| 4,509,870 | 4/1985 | Taki | 384/296 |
| 4,682,065 | 7/1987 | English | 310/67 R |

FOREIGN PATENT DOCUMENTS

| 0149228 | 7/1985 | European Pat. Off. . | |
| 0160971 | 11/1985 | European Pat. Off. . | |
| 2749729 | 5/1979 | Fed. Rep. of Germany | 310/67 R |
| 1399839 | 4/1965 | France | 310/67 R |
| 2350721 | 12/1977 | France . | |
| 2559319 | 8/1985 | France . | |
| 0088903 | 8/1978 | Japan | 310/51 |
| 0023710 | 2/1980 | Japan | 310/67 R |
| 1013643 | 4/1983 | U.S.S.R. | 384/215 |
| 0995534 | 6/1965 | United Kingdom | 310/51 |

*Primary Examiner*—R. Skudy
*Attorney, Agent, or Firm*—Young & Thompson

[57] ABSTRACT

An electric motor provided with a bearing of improved design has a stator (1) supported by a mounting frame (3) and a rotor (4) in rigidly fixed relation to a shaft (5), the shaft being rotatably mounted in a plain bearing (7) placed within a tubular support (8) which is rigidly fixed to the motor frame (3). A sleeve (23) composed of material having a sufficient degree of elastic deformability to absorb vibrations is interposed between the outer face (24) of the bearing (7) and the inner face of the tubular support (8). The electric motor is intended in particular to equip propeller-type fans and is primarily applicable to direct-current motors of the electronic commutation type.

5 Claims, 3 Drawing Sheets

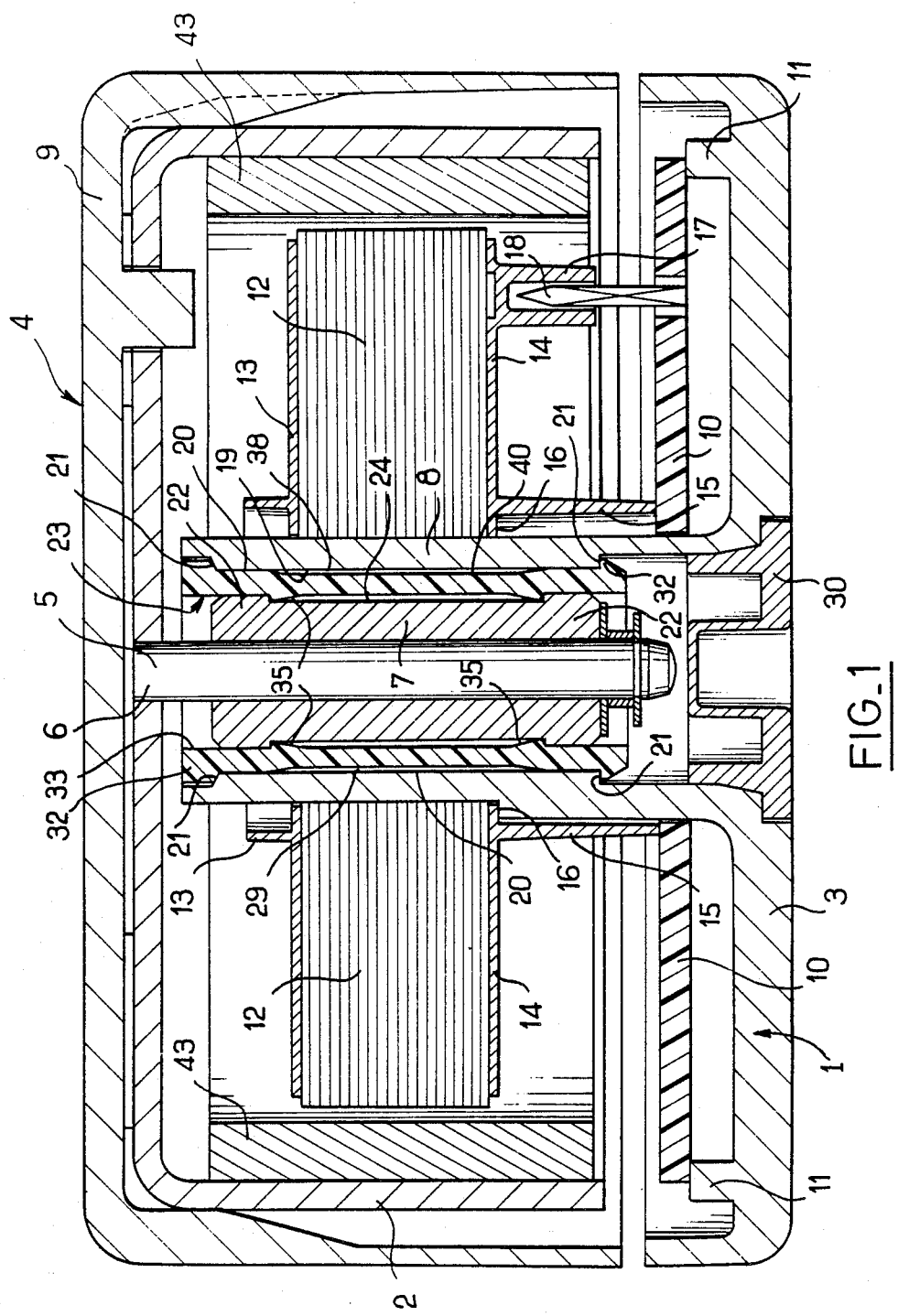
FIG_1

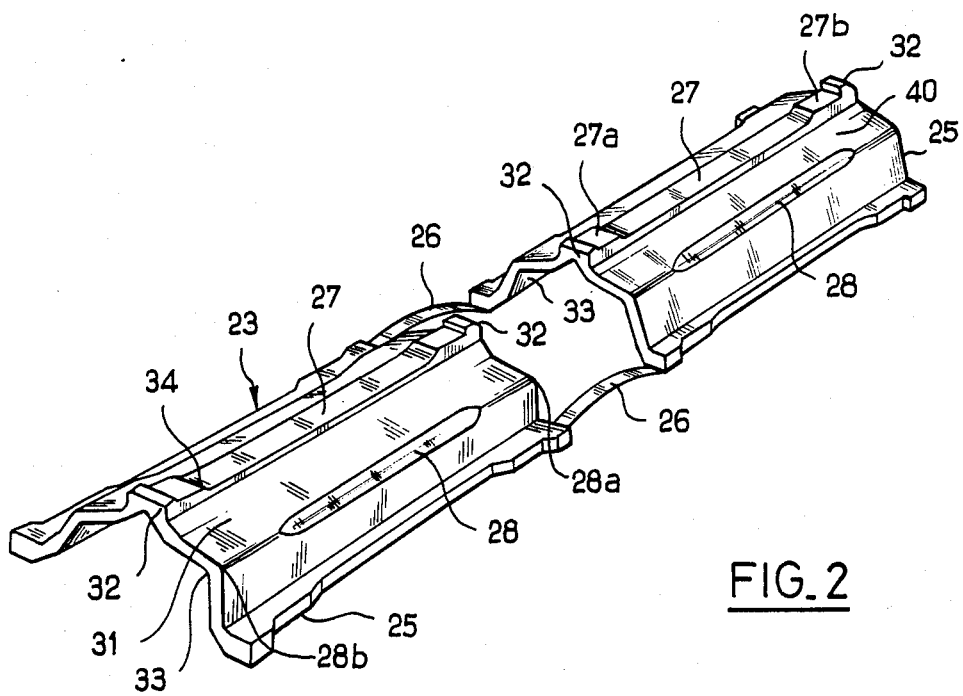
FIG_2
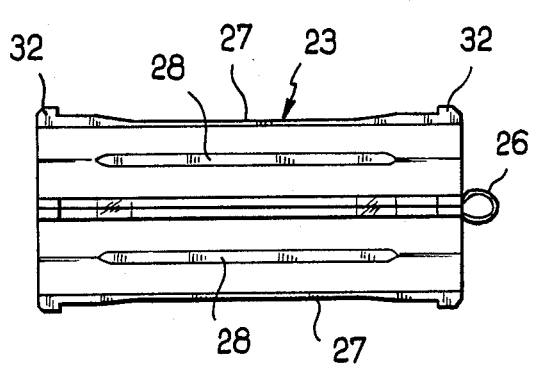
FIG_3
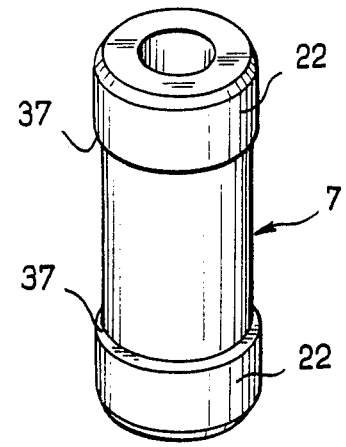
FIG_4

ELECTRIC MOTOR WITH AN IMPROVED BEARING

BACKGROUND OF THE INVENTION

1. Field of the Invention

The present invention relates to an electric motor which is intended in particular for propeller-type fans, the rotor shaft of said electric motor being rotatably mounted in a plain bearing placed within a tubular support which is rigidly fixed to the motor frame.

2. Description of the Prior Art

Plain bearings of sintered alloy, for example, are particularly advantageous in small electric motors. They are in fact self-lubricating and are not only less costly to produce than ball-bearings but also provide quieter operation than these latter. It is for this reason that the use of plain bearings often proves advantageous, particularly in the case of electric motors which are employed for driving fans and the acoustic noise performances of which are of primary importance.

One plain bearing of known type which is particularly advantageous consists of a single cylindrical part which extends along the entire rotating portion of the rotor shaft, thereby eliminating the problems of alignment related to the use of two bearings in axially spaced relation.

In spite of these advantages, this type of bearing is still in relatively limited use since it suffers from practical difficulties, especially in regard to immobilization of the bearing in its support. It is in fact usually forcibly fitted within a tubular support rigidly fixed to the motor frame or even directly within an axial bore formed in said frame. By reason of this intimate contact between the bearing and the motor frame, the shocks to which the frame is subjected, for example as a result of imbalance of the rotor, are transmitted to the bearing which behaves as an amplifier and produces vibrations. This is particularly true in the case of a rotor which is rigidly fixed to the propeller. In some instances, this phenomenon may acquire such preponderance as to nullify the advantages of a plain bearing over ball-bearings in regard to acoustic-noise performances.

Furthermore, the sintered alloy which constitutes this type of bearing is relatively brittle and is consequently liable to suffer degradation as a result of overheating which essentially arises from the operation of the motor or from mechanical stresses related to faulty centering of the rotor shaft.

SUMMARY OF THE INVENTION

The object of the invention is to propose an electric motor, in particular for a propeller fan of the type aforesaid which is not attended by the disadvantages mentioned in the foregoing.

Thus the electric motor contemplated by the invention has a stator supported by a mounting frame and a rotor in rigidly fixed relation to a shaft which is rotatably mounted within a plain bearing, said plain bearing being placed within a tubular support which is rigidly fixed to the frame.

In accordance with the invention, said motor is distinguished by the fact that a sleeve composed of material having a sufficient degree of elastic deformability to absorb vibrations is interposed between the outer face of the bearing and the inner face of the tubular support.

In this manner, the vibrations to which the motor frame are subjected are absorbed by the sleeve and are not transmitted to the bearing, with the result that the acoustic-noise performances of the motor are not impaired. In practice, the material constituting the sleeve is chosen as follows: the technical expert determines the amplitude and frequency of the vibrations which are produced when no sleeve is present. The technical expert then chooses a sleeve which has a certain degree of elasticity and examines this latter with a view to determining whether it is capable of absorbing the vibrations. Should this not be the case, he accordingly selects a sleeve having a higher or lower modulus of elasticity. Experience has shown that the elastomers which are best suited for this purpose are those which have an intermediate modulus of elasticity between elastomers having the lowest values of hardness and elastomers having the highest values of hardness.

When selecting the elastomers, preference will also be given to those which offer the highest resistance to aging and to heating. In an advantageous embodiment of the invention, the sleeve extends within the tubular support over a distance at least equal to the length of the bearing and the outer face of said sleeve is provided with longitudinal splines.

The splines permit a flow of air around the bearing and thus prevent overheating of the bearing which is consequently not subject to premature wear.

In another advantageous embodiment of the invention, the plain bearing has a collar at each end, the rim of each collar being adapted to rest on abutment lugs which project from the inner face of the sleeve.

Thus the bearing is effectively retained within the sleeve and consequently within the tubular support.

Preferably, the sleeve is formed by two sleeve elements joined together by means of bendable coupling straps which are molded in a single piece. The sleeve is thus readily formed by molding and by axial removal from the mold.

BRIEF DESCRIPTION OF THE DRAWINGS

Other features of the invention will be more apparent to those versed in the art upon consideration of the following description of an electronic-commutation direct-current motor in accordance with the invention, reference being made to the accompanying drawings, wherein:

FIG. 1 is a radial sectional view of an electric motor according to the invention;

FIG. 2 is a perspective view of the two sleeve elements according to the invention;

FIG. 3 is a plan view of the sleeve in the position of assembly;

FIG. 4 is a perspective view of a plain bearing according to the invention;

DESCRIPTION OF THE PREFERRED EMBODIMENTS

Figure 5:
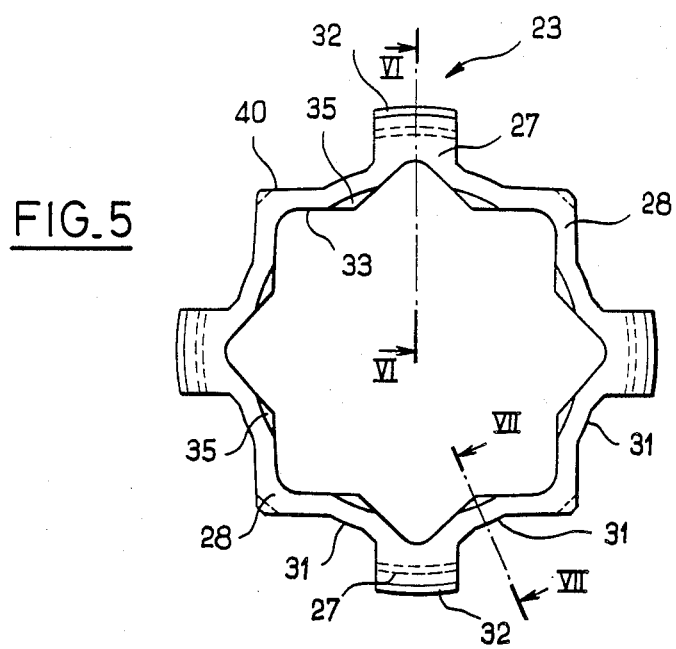
FIG. 5 is a radial sectional view of the sleeve.
Figure 6:
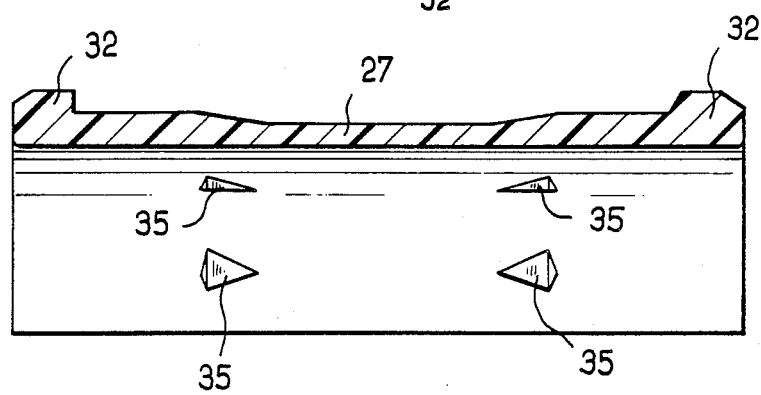
FIG. 6 is a longitudinal half-section of the sleeve, this view being taken along the plane VI—VI of FIG. 5.
Figure 7:
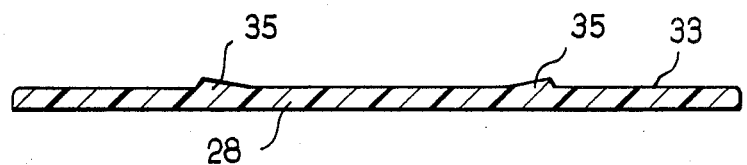
FIG. 7 is a longitudinal half-section of the sleeve, this view being taken along the plane VII—VII of FIG. 5.

The electric motor illustrated in FIG. 1 has a stator 1 supported by an end-shield 3 which forms a mounting frame and a rotor 4 rigidly coupled for rotation with a shaft 5, one end 6 of which is forcibly engaged in a bell-housing 2 for closing the magnetic field, said shaft 5 being rotatably mounted within a plain bearing 7 placed within a tubular support 8 which is integral with the end-shield 3.

Translational locking of the shaft 5 of the rotor 4 with respect to the stator 1 is carried out in the conventional manner.

In the example illustrated, the motor is of the external-rotor type and the bell-housing 2 for closing the magnetic field is rigidly fixed to a shell 9 having the intended function, for example, of supporting the impeller of a fan driven by said motor.

The stator 1 is fitted with a printed-circuit board 10 which carries the elements (not illustrated) of the electronic control circuit of the motor. Said printed-circuit board 10 is placed so as to bear on annular abutment ribs 11 molded in one piece with the end-shield 3 at the same time as the tubular support 8.

The stator 1 is provided in addition with a stack 12 of sheet-iron laminations, the stator windings (not shown in the drawings) being wound on said stack and intended to cooperate in rotation with an annular magnet 43 carried by the inner face of the housing 2. Said stack 12 of sheet-iron laminations is provided with a central bore having a diameter which is equal to the external diameter of the tubular suppor 8 and is forcibly fitted over this latter in such a manner as to ensure that the axis of said central bore, the axis of the tubular support 8 and the axis of the end-shield 3 are in alignment. Said stack 12 of laminations is covered with an insulating jacket formed by an upper cup 13 and a lower cup 14 which are so designed as to engage axially one inside the other and are formed, for example, of injected plastic material. The lower cup 14 has a central cylindrical base 15 which is applied against the printed-circuit board 10. In order to increase this bearing surface, the tubular support 8 is provided with annular shoulders 16 which have the function of supporting the lower cup 14. This latter is also provided with columns 17, each column being adapted to support a conductive connector-pin 18 on which is wound one of the ends of the stator winding. The other end of the connector-pin 18 is plugged into the printed-circuit board 10 and connected to the conductive tracks printed on this latter so as to establish an electric connection between the corresponding stator winding and the electronic control circuit of the motor.

Moreover, the inner face 19 of the tubular support 8 has a projecting portion 20 which extends over a height substantially equal to that of the plain bearing 7, an annular shoulder 21 being formed on said inner face 19 on each side of the projecting portion 20. The bearing 7 has a collar 22 at each end (as shown in FIG. 4). The axis of said bearing 7, the axis of the tubular support 8 and of the shaft 5 of the rotor 4 are aligned. Finally, an end-cap 30 closes the orifice formed by the bore of the tubular support 8 within the end-shield 3.

In accordance with the invention, a sleeve 23 composed of material having sufficient elastic deformability to absorb vibrations and shocks is interposed between the outer face 24 of the bearing 7 and the inner face 19 of the tubular support 8 and extends within this latter over a distance at least equal to the length of the bearing 7. Said sleeve 23 is preferably formed of elastomer molded in a single piece and having very good mechanical and physical characteristics, especially in regard to temperature strength and resistance to aging. This is the case, for example, of the product marketed under the trade-mark Hytrel (a glass-loaded polycarbonate) by Dupont de Nemours. As has been verified by experimentation carried out by the present Applicant, this product makes it possible to achieve the objective contemplated by the invention. In order to facilitate molding and to permit strictly axial removal from the mold, the sleeve is made up of two sleeve elements 25 of semi-cylindrical shape (as illustrated in FIG. 2) and joined together by means of two coupling straps 26 molded in one piece with the two elements. These two coupling straps 26 preferably extend along the axis of the sleeve elements 25 so that, after bending or in other words when the sleeve 23 is ready to be mounted within the tubular support 8, said coupling straps are located outside the bore formed by said tubular support and do not hinder the introduction of the sleeve 23 within this bore. However, a lateral arrangement of the coupling straps 26 with respect to the sleeve elements 25 could be contemplated on condition that they have a sufficiently thin cross-section to be cut-off flush with the end of the sleeve 23 at the time ot assembly of this latter within the tubular support 8. The presence of these coupling straps is in fact no longer necessary once the assembly operation has been completed.

FIGS. 2 and 5 to 7 illustrate the form of construction of the sleeve 23 in greater detail.

The outer face 40 of the sleeve 23 is provided with longitudinal splines composed of splines 27 having a rectangular cross-section and splines 28 having a triangular cross-section arranged in a regular alternate sequence around the periphery of the sleeve 23. The height of said splines 27, 28 is greater in the vicinity of their end portions designated respectively by the references 27a, 27b and 28a, 28b. In consequence, the envelope circumference of a radial cross-section of the sleeve 23 produced in this region has a diameter which is substantially equal to that of the bore of the tubular support 8. The height of the bearing zone thus formed is substantially the same as the height of the collars 22 of the plain bearing 7, with the result that the sleeve 23 is in contact with the tubular support 8 solely in this zone and that an annular gap 29 is formed between these two elements in the central portion of the assembly. In conjunction with the longitudinal grooves 31 formed between the adjacent splines 27, 28 (as shown in FIG. 5), the aforementioned annular gap 29 permits better circulation of air in this region of the bearing 7 and limits the contact between this latter and the structure of the stator 1, thus permitting a very appreciable reduction in heat build-up produced by the operation of the motor in the vicinity of said bearing 7.

The splines 27 of rectangular cross-section are provided at each end portion 27a, 27b with a radial extension in the form of a hook 32 having a chamfered shoulder 34 (as shown in FIG. 2). At the time of assembly of the sleeve 23 within the bore of the tubular support 8, the hooks 32 engage on the annular shoulders 21 defined by the projecting portion 20 of said tubular support 8 (said projecting portion being shown in FIG. 1). The sleeve 23 is thus securely held in position within the support 8. Positional maintenance of the plain bearing 7 within said sleeve is in turn ensured by means of abutment lugs 35 which project from the internal wall 33 of this latter and on which rest the rims 37 formed by the collars 22 of the plain bearing 7 (as shown in FIG. 4). After assembly, the bearing 7 is in contact with the internal wall 33 of the sleeve 23 only opposite to the collars 22 so that an annular gap 38 (as shown in FIG. 1) is also formed between the sleeve 23 and the bearing 7, thus also serving to achieve enhanced air flow between these elements.

Two alternative modes of assembly are open to choice:

bending of the coupling straps 26; the two sleeve elements 25 are assembled around the plain bearing 7 and the entire assembly is forcibly introduced into the bore of the tubular support 8 until the hooks 32 engage over the annular shoulders 21 of said support by resilient snap-action engagement;

bending of the coupling straps 26; the two sleeve elements 25 are placed against each other and the sleeve 23 thus reconstituted is introduced into the bore of the tubular support 8 until snap-action engagement of the hook 32 takes place as before. The bearing 7 is then forcibly inserted in the sleeve 23 until the abutment lugs 35 are located in a position in which they are applied against the rims 37 of the collars 22 of the bearing 7.

It is clear from the foregoing that, in the case of either of these two alternatives, automation of this assembly procedure can be achieved with particularly great ease. In point of fact, this procedure involves only two operations which do not call for a very high degree of accuracy since the resilient sleeve 23 not only has a vibration-damping function but is also permitted by its elastic nature to compensate for imperfections of concentricity which may exist between the different elements.

Without departing from the scope of the present invention, the configuration of the sleeve as described in the foregoing could be modified primarily with a view to permitting adaptation to the different types of plain bearings which already exist, particularly in regard to the number and profile of the splines and the location of the abutment lugs.

Moreover, even if the motor described is a direct-current motor with electronic commutation, the invention is clearly not limited to this type of motor but may be applied to any rotating-shaft electric motor of either the alternating-current or direct-current type.

What is claimed is:

1. An electric motor, having a stator (1) supported by a mounting frame (3) and a rotor (4) rigidly secured to a shaft (5) which is rotatably mounted within a plain bearing (7), said plain bearing being disposed within a tubular support (8) which is rigidly fixed to said stator (1), and a sleeve (23) composed of material having a sufficient degree of elastic deformability to absorb vibrations interposed between the outer face (24) of the bearing (7) and the inner face (19) of said tubular support (8), the outer face (40) of said sleeve (23) having longitudinal splines (27, 28) thereon.

2. An electric motor according to claim 1, wherein alternate said splines (27, 28) are of rectangular cross-section.

3. An electric motor according to claim 1, wherein the height of the splines (27, 28) in regions adjacent to the ends of the sleeve (23) is such that said splines are in contact with the inner face (19) of the tubular support (8) only opposite to said regions so as to provide an annular gap (29) between the sleeve (23) and the inner face (19) of the tubular support (8) in a central region located between said regions.

4. An electric motor according to claim 2, wherein the splines (27) of rectangular cross-section are provided at each end portion thereof (27a, 27b) with an extension in the form of a hook (32) which bears on an annular shoulder (21) of the tubular support (8) so that the sleeve (23) is thus rigidly fixed to said tubular support (8).

5. An electric motor according to claim 1, wherein the sleeve (23) is formed by two sleeve elements (25) joined together by means of bendable coupling straps (26).

* * * * *